Jan. 19, 1943.  V. S. MAKAROFF  2,308,764
AIRPLANE
Filed April 30, 1940  2 Sheets-Sheet 1
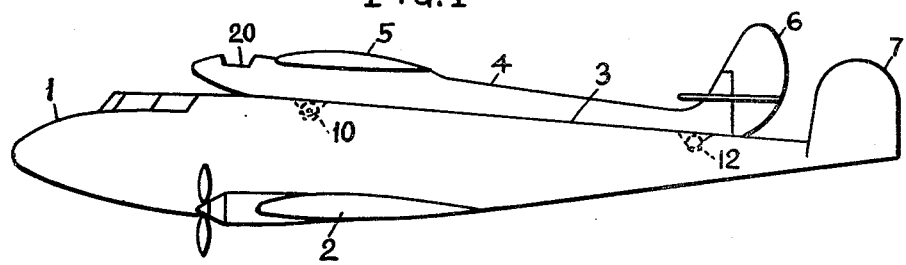
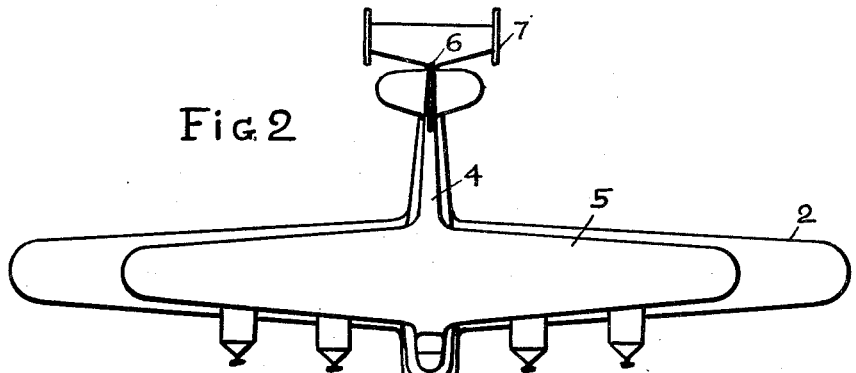
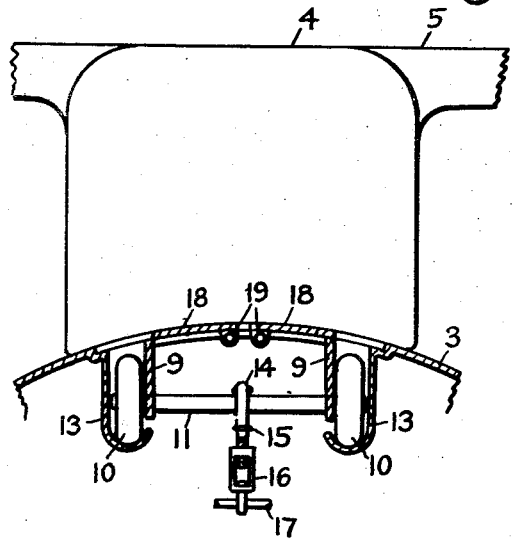
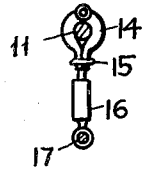
VADIM S. MAKAROFF
INVENTOR.
BY
ATTORNEY Jan. 19, 1943.    V. S. MAKAROFF    2,308,764
AIRPLANE
Filed April 30, 1940    2 Sheets-Sheet 2

VADIM S. MAKAROFF
INVENTOR.

BY  John P. Nixon

ATTORNEY

Patented Jan. 19, 1943

2,308,764

UNITED STATES PATENT OFFICE 2,308,764

AIRPLANE

Vadim S. Makaroff, New York, N. Y.

Application April 30, 1940, Serial No. 332,446

1 Claim. (Cl. 244—2)

My invention relates to aircraft and has particular reference to composite airplanes with auxiliary aircraft detachably mounted on the airplanes for taking off under full load.

One of the outstanding problems in aviation is to provide sufficient lifting capacity for a transport plane for taking off under full load of fuel for long distance flights. Modern airplanes, designed to fly under full load at speeds of two hundred miles per hour or better, cannot develop such a speed while still on the ground, and, therefore, even with a reserve power, they are still unable to take all the load which they could easily carry once they are in the air and develop their normal speed.

My invention has for its object, therefore, to provide means for increasing the lift of an airplane during the take-off, thereby enabling the airplane to take a much greater load than it would be possible without my arrangement. The increased lifting means, according to my invention, is discarded after the take-off and is safely returned to the ground to be used over again.

As a convenient arrangement for this purpose I provide a glider detachably mounted on an airplane, the wings of the glider being so proportioned as to give the necessary additional lift during the take-off. The glider is provided with a cockpit for a pilot whose duty is to return the glider to the airport after the airplane has taken off and departed and the glider has been released from the airplane by the pilot of the latter.

The fuselage of the glider can be made very light and relatively small, while the wings may be relatively larger and stronger than is necessary for an ordinary glider. The glider may be provided with a small auxiliary motor in order to facilitate its landing at the airport under most adverse conditions.

The glider is preferably provided with an undercarriage and wheels. The undercarriage may be used for removably attaching the glider to the fuselage of the airplane, as, for instance, by suitable rods, pins or similar locking devices, extending from the fuselage of the transport airplane and engaging the landing gear of the glider. For gliders with a long wing span, the landing wheels may be preferably placed under the wings, in which case the fuselage may be attached by special hooks. The locking devices can be withdrawn by the pilot for releasing the glider when the airplane can safely discard the latter.

It should be noted that the auxiliary glider or airplane in my system, while providing additional lift for the main airplane, is at all times under action of lifting forces, so that, for its removal, it is only necessary to disconnect it from the main airplane, thereby causing the latter to drop, and the air lift will carry it upward and away from the main airplane, without any necessity for a special adjustment of the relative values of lifts between the two airplanes at the moment of separation, as is required in the known systems in which the auxiliary airplane carries the main airplane on its back.

The glider wings may be specially designed for the maximum lift at slow speeds in order to be most effective during the take-off, while the main airplane must have its wings designed for the maximum lift at the highest speeds.

An auxiliary glider, as compared to an auxiliary powered airplane, has an advantage of its light weight in relation to the relatively large lifting capacity of its wings. Such a saving in weight not only reduces the extra strain on the landing gear of the main airplanes and on its fuselage, but also reduces the operating expenses in connection with the maintenance and fueling of the auxiliary power plant.

My invention is more fully described in the accompanying specification and drawings in which—

Fig. 1 is an elevational view of my airplane with an auxiliary glider;

Fig. 2 is a top plan view of the same on a reduced scale;

Fig. 3 is a fractional front view of the same;

Fig. 4 is a detail view of the snap hook for the glider;

Figure 5:
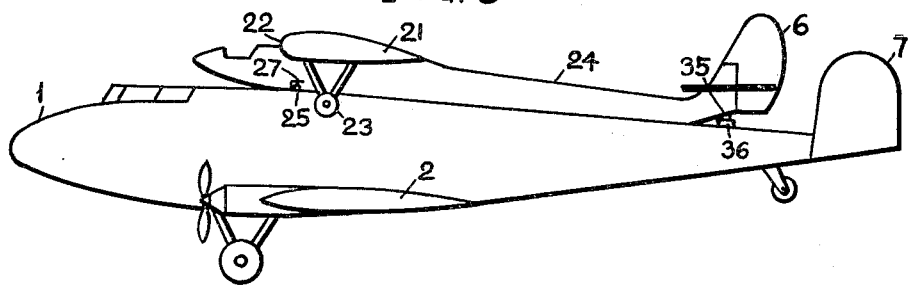
Fig. 5 is an elevational view of a modified composite aircraft.

My composite aircraft consists of an airplane 1 preferably of a large transport type, which may be also a military bombing plane. It has wings 2, preferably below the fuselage, the latter having an approximately straight back or upper side which serves as a support for an auxiliary aircraft 4 of a glider type. The latter has relatively large wings 5 and a light, elongated fuselage extending to the rear end of the airplane when the glider wings are place directly above the wings 2 of the airplane, thereby converting the airplane into a biplane. The under side of the glidder is flattened and even may be made concave as shown in Fig. 3 in order to fit it snugly against the upper side of the fuselage 1 and to avoid any air pressure on the under side of the glider fuselage in flight. The glider is provided at the rear with a relatively large vertical rudder 6, preferably positioned above the rudders 7 of the air plane 1, and also relatively large horizontal rudders or elevators 8 placed between the vertical rudders 7 of the airplane 1.

The glider has landing gear brackets 9, Fig. 3, with wheels 10 on a shaft 11 at the front and a similar wheel 12 at the rear. The brackets with the wheels are fitted in pockets or recesses 13 in the fuselage 1 when the glider is placed on top of the airplane. The shaft 11 is then engaged by a hinged hook 14 which may be locked by a snap ring 15. The hook is then connected with a tightening turnbuckle 16 attached at the other end to a bar 17 permanently supported in the fuselage 1. A similar attachment is provided for the rear wheel 12. The pockets 13 may be closed with lids 18 sliding on the upper side of the fuselage and operated by handles 19 sliding in corresponding slots in the deck 3 of the fuselage.

The snap hooks at the front and at the rear may be operated simultaneously by members of the crew of the airplane at the order of its pilot, or a suitable mechanical or electrical means may be employed directly operated by the pilot through a suitable remote control.

The glider has a suitable cockpit 20 for its pilot who guides the glider to its landing after its release by the pilot of the main airplane. The glider pilot does not need to manipulate his controls until the glider has been released, since at the releasing speed the lift on the glider wings will be sufficient to raise it away from the main airplane.

The glider may be provided with a small motor, insufficient for a sustained flight, but useful in landing under adverse conditions. Such a motor, unlike motors in powered auxiliary units in composite aircraft, does not help in any way the main motor during the take-off, and, in fact, due to its small power, may even offer a slight resistance, and its only object is to improve the maneuverability of the glider when it is detached.

Due to the fact that the glider must develop the greatest lifting force during the take-off, it may be desirable to provide it with specially shaped wings 21 as shown in Fig. 5, having blunt leading edges 22, unlike more or less pointed edges of the wings 2 of the main airplane which are designed for the maximum of lift at the high speeds.

Figure 6:
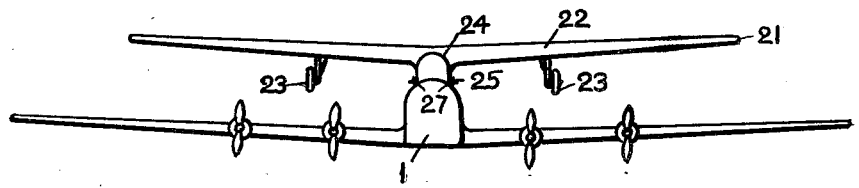
Fig. 6 is a front view of the same.
Figure 7:
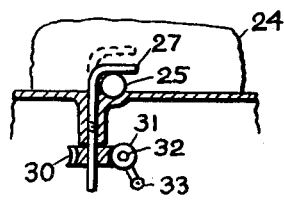
Fig. 7 is a detail view of the attachment of the glider.
Figure 8:
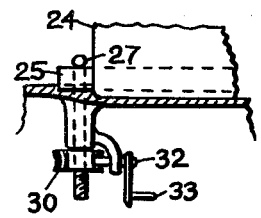
Fig. 8 is another view of the same.
Figure 9:
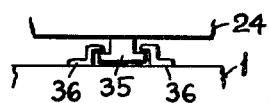
Fig. 9 is a detail view of the rear glider attachment.

In order to increase its lifting capacity, the glider may be provided with long wings in which case it may be desirable to place landing wheels 23 on the wings as shown in Figs. 5 and 6. The fuselage 24 is provided with transverse bars 25 and 26 engaged by disappearing hooks 27 and 28, having threaded stems 29 with nuts 30 in the form of worm gears. The latter are operated by worms 31 on shafts 32 with cranks 33 for their manual operation. It is understood, of course, that electric motors may be employed instead of the cranks for operating the worms. The upper side of the airplane fuselage is provided with recesses 34 for the bars 25 and 26, preventing their sliding rearward under pressure of the drag in flight when the hooks are tightened. By raising the hooks into a position shown in dotted lines in Fig. 7, the bars are made free to move from the recesses, and the glider is moved away from the airplane by the drag and lift on its wings. The rear end of the glider has a T-shaped hook 35 sliding between guiding member 36, Fig. 9. No provision for tightening of the hook is necessary at the rear since the hook cannot become disengaged until both front hooks are released. It should be noted that with this construction, the front hooks can be released one at a time since the glider cannot be freed until the last hook is disengaged.

The glider may be also of a conventional type, without any landing gear, or with a retractable landing gear if preferred.

In order to reduce the interference between the airplane and the glider wings, it is preferable to use the airplane with low wings and the glider with high wings as shown in Figs. 1 and 5.

It is understood that my composite airplane may be further modified without departing from the spirit of the invention, as set forth in the appended claim.

I claim as my invention:

An aircraft comprising an airplane and a glider, the under surface of the glider corresponding throughout its length to the upper surface of the airplane fuselage, the composite aircraft being of a normal streamlined shape, means to releasably retain the glider on the airplane, a pilot's seat and controls in the glider for its landing by a pilot when released from the airplane, the separated airplane and glider being of a normal streamlined shape and capable of independent flight, a landing gear on the glider, the fuselage of the airplane having pockets for the glider landing gear, means to releasably engage the glider landing gear in the airplane fuselage pockets, and means to cover the pockets when the glider is released.

VADIM S. MAKAROFF.